July 29, 1952  T. R. SMITH  2,604,764
OVERLOAD RELEASE COUPLING
Filed Oct. 27, 1948  2 SHEETS—SHEET 1
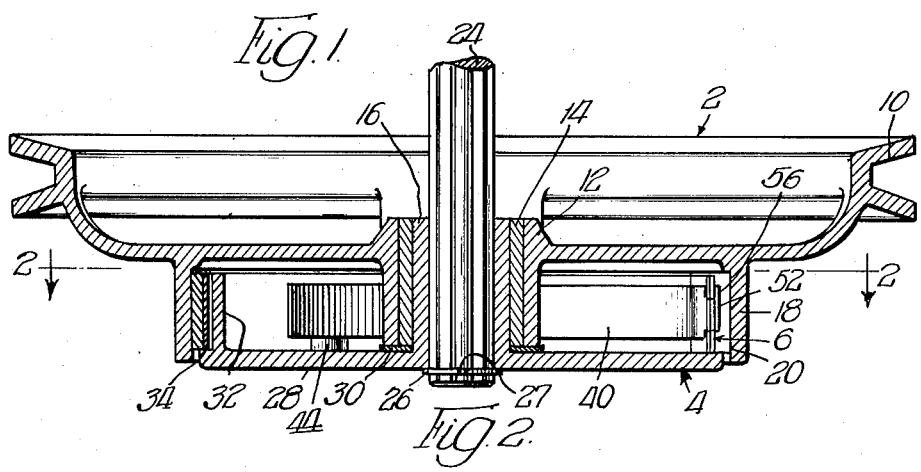
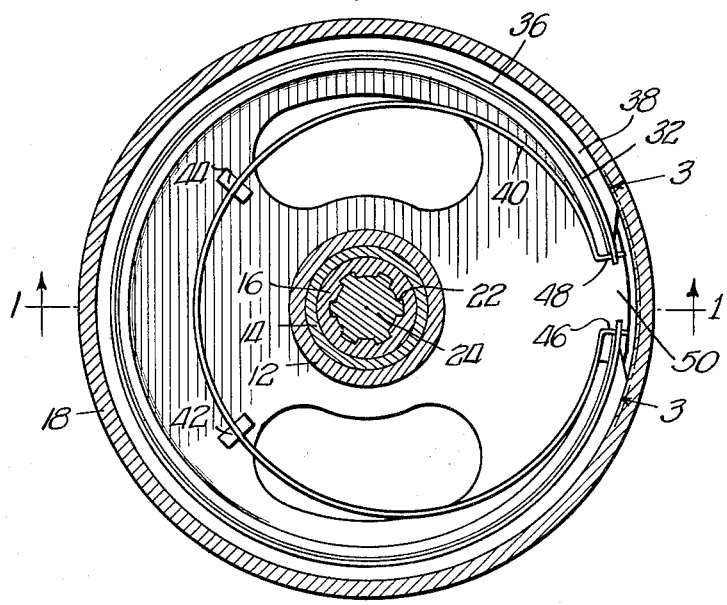
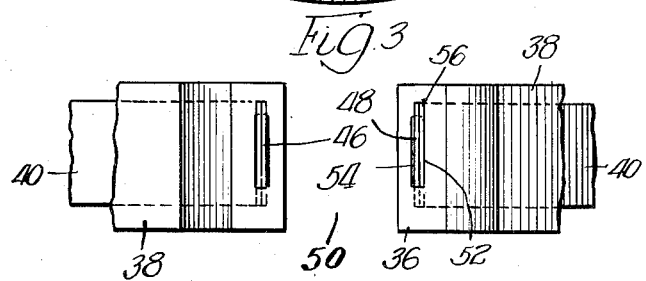
INVENTOR.
Thomas R Smith,
BY
Wilkinson, Huxley, Byron & Hume
Attys.

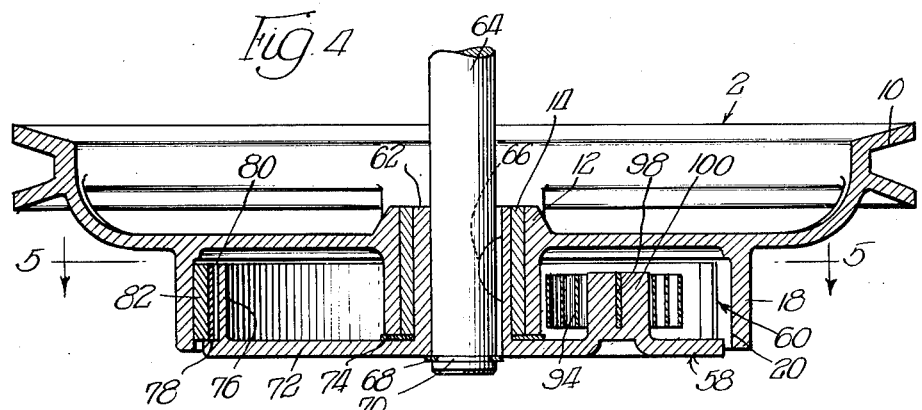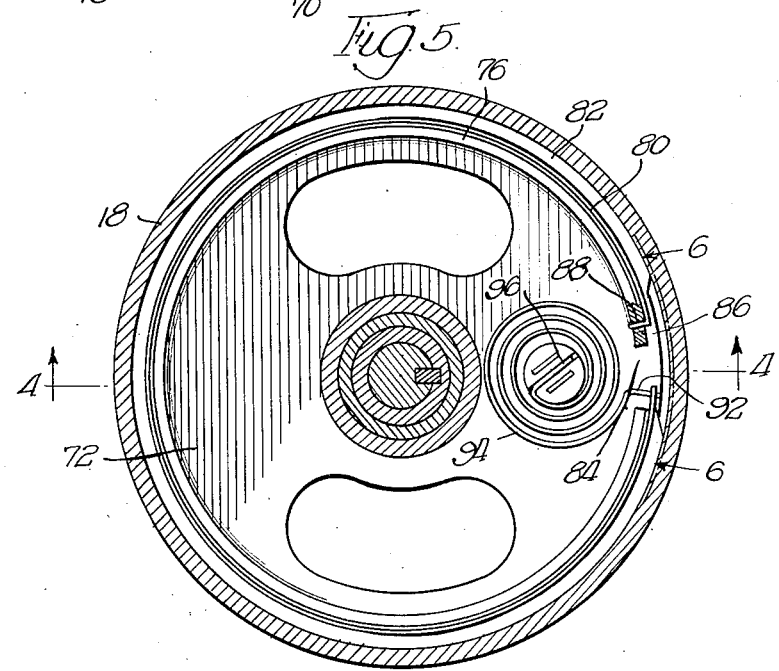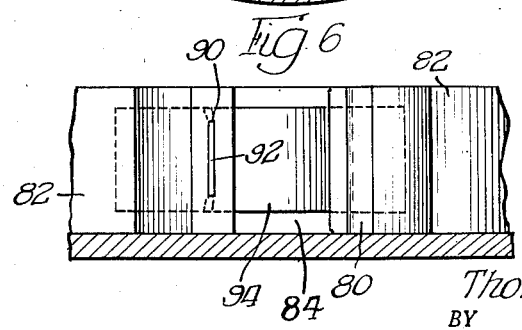

Patented July 29, 1952

2,604,764

UNITED STATES PATENT OFFICE 2,604,764

OVERLOAD RELEASE COUPLING

Thomas R. Smith, Newton, Iowa, assignor to The Maytag Company, Newton, Iowa, a corporation of Delaware Application October 27, 1948, Serial No. 56,845

10 Claims. (Cl. 64—30)

The present invention relates to friction clutches and more particularly to friction clutches which are essentially independent of normal variations in coefficient of friction and operate to transmit a constant torque in a predetermined amount from a driving member to a driven member but which permit slippage between these members when the torque exceeds such predetermined amount.

Among the objects of the present invention is to provide a constant torque slip clutch of simple construction which in one direction of rotation of a driving member effects a frictional drive between said member and a driven member for transmitting torque in a predetermined amount, but which permits slippage between the members when the torque exceeds such predetermined amount and which at the same time provides a non-slip driving connection between said members upon rotation of said driven member in the opposite direction.

In many power transmitting assemblies, the capacity required of an electric motor to cause rotation at normal operating speeds of some instrumentality driven thereby is less than is necessary to bring said instrumentality up to speed from rest within relatively short periods of time. In such instances, the initial load placed upon the motor would be such as to burn out the field windings of the motor unless some provision is made to control the load whereby the motor is not overloaded during the time when the load is initially applied to said motor. From an economical standpoint, it is more desirable to provide a motor of capacity sufficient to operate the instrumentality at normal operating speeds of rotation and to provide some means to prevent overloading of the motor during the initial starting operation, otherwise a larger motor would be necessary to carry the load placed upon it during the initial starting operation. Such means may take the form of a clutch mechanism adapted to permit slippage between the motor and the instrumentality during the initial starting operation to protect the motor against being overloaded, the said clutch mechanism being so designed as to eliminate the slippage after the instrumentality has been brought up to normal operating speeds, whereby the motor is capable of operating under non-slip conditions to maintain this normal operating speed. Clutches of this type are particularly adapted for use in washing machines in which a basket or receptacle is brought up to speed for spinning the basket to remove liquid from the material contained therein. In such devices, a motor of relatively small capacity may be used to bring the basket from rest up to operating speed within a reasonable length of time by providing a friction clutch of the type herein contemplated between the motor and basket to prevent overloading of the motor during that period of time, after which the motor operates to spin the basket at normal operating speed without slippage in the clutch mechanism.

It is, therefore, an object of the invention to provide novel clutch mechanisms adapted to be used under the circumstances immediately above enumerated, whereby some instrumentality, such as a basket or container for a washing machine, together with its load, may be brought up to normal operating speeds within a reasonable length of time without overloading the driving motor, but which provides for transmittal of torque without slippage once the normal operating speed has been attained.

Other objects, features, capabilities and advantages are comprehended by the invention, as will later appear and as are inherently possessed thereby.

Referring to the drawings:

Figure 1 is a vertical cross-sectional view of a constant torque slip clutch made in accordance with the present invention, the same being taken in a plane represented by line 1—1 of Figure 2 of the drawings;

Figure 2 is a horizontal cross-sectional view of the clutch taken in the plane represented by line 2—2 of Figure 1;

Figure 3 is an enlarged fragmentary view in elevation taken in the plane represented by line 3—3 of Figure 2 of the drawings;

Figure 4 is a vertical cross-sectional view similar to that of Figure 1 of the drawings, disclosing a modified form of clutch mechanism, the same being in the plane represented by line 4—4 of Figure 5 of the drawings;

Figure 5 is a horizontal cross-sectional view taken in the plane represented by line 5—5 of Figure 4 of the drawings; and Figure 6 is an enlarged fragmentary view in elevation taken in the plane represented by line 6—6 of Figure 5 of the drawings.

Referring now more in detail to the drawings, an embodiment selected to illustrate the present invention is disclosed in Figures 1, 2 and 3 of the drawings as comprising a driving member in the form of a pulley 2, a driven member 4 and a friction clutch mechanism, generally referred to as 6, which is adapted to transmit torque from the driving member to the driven member. This illustrative example of the invention is particularly suitable for a power drive in a washing machine of the type in which a washing operation, including the washing of the clothes and the drying of the clothes by centrifugal action is effected. The pulley 2 has a V-shaped peripheral groove 10 adapted to receive a belt driven by a suitable source of power, such as an electric motor or the like, which is adapted to rotate the pulley and the mechanism operatively connected thereto. This pulley 2 is formed with a central hub 12 having a bushing or bearing 14 which is mounted for rotation about a central hub 16 of the driven member 4. Disposed in spaced relation to the central hub 14 is a cylindrical wall 18 depending downwardly from the body portion of the pulley which provides a cylindrical wall surface 20 adapted to be frictionally engaged by the clutch mechanism 6.

The hub 16 of the driven member is splined, as at 22, to a driven shaft 24 for operating any desired instrumentality. The said driving and driven members are secured in operative relation to the shaft 24 by means of a spring retaining member 26 mounted within an annular groove 27 formed in the driven shaft 24 adjacent its end which is disposed in abutting relation to the driven member 4. The driven member 4 is further characterized as being provided with a disc-shaped body portion 28 extending radially and outwardly from the central hub 16 and which is adapted to support the pulley 2 through a washer 30 which surrounds the central hub 16 and is in bearing relation to the central hub 12 and bearing 14 of the pulley 2. The driven member 4 is further provided with an upstanding wall 32 disposed radially and inwardly of the periphery thereof to form an annular shoulder 34, this wall 32 being disposed in opposite and spaced relation to the wall 18 of the pulley 2. Mounted upon the annular shoulder 34 of the driven member and disposed within the space between the walls 18 and 32 is an expansible brake band 36 having a brake band lining 38 attached thereto which is adapted to be expanded into frictional engagement with the inner surface 29 of wall 18 whereby torque is transmitted between the driving member 2 and the driven member 4.

The clutch mechanism of the present invention is designed for transmitting a constant torque in a predetermined amount from the driving member 2 to the driven member 4 when said driving member is rotated in either a clockwise or counterclockwise direction, as viewed in Figure 2 of the drawings, and which will permit slippage between the two members when the torque exceeds that amount. Such clutch mechanism includes a curved spring element 40 carried by the brake band 36 disposed within the space defined by the wall 32 and wall 18 thereof. The central portion of this curved spring element rests upon the lugs 42 and 44 and the same has radially disposed end portions 46 and 48 extending outwardly through an opening 50 provided in the wall 32. As more clearly shown in Figures 1 and 3 of the drawings, the end portions 46 and 48 are each formed with a tongue 52 of less width than the width of the spring element 40 which is adapted to be received within one of the slots 54 formed in and adjacent the ends of the clutch band 36. Each of these tongue portions 52 is provided with a lateral or upstanding projection 56 which interlocks with the clutch band 36 to hold the spring 40 in associated relation with said clutch band.

As will be clearly apparent, the spring 40 is connected to the clutch band by moving the spring element 40 into angular relation to the clutch band at which time the projection 56 of each of the tongues can be inserted into one of the slots 52 at each end of the clutch band. The spring element 40 may then be moved into its substantially horizontal position as shown in the drawings, during which time the projections 56 interlock with the ends of the brake band to hold the same in assembled relation.

The embodiment shown in Figures 1, 2 and 3 is designed for transmittal of a constant torque between the driving member and the driven member when the driving member is rotated in either direction. As shown in Figure 2, the driving member is shown as being rotated in a counter-clockwise direction at which time the radially disposed end portion 48 of the spring 40 abuts one edge of the wall 32 which defines the opening 50 to position the clutch band and the lining, while the other end of the spring 40 is effective in applying a force to the brake band for expanding the brake band lining 38 into frictional engagement with the friction surface 20 for the transmission of a constant torque from the driving member to the driven member. Thus it will be seen that the spring 40 transmits all of the torque from the driving to the driven member. In the event the clutch mechanism is overloaded, because of an overload on the driven member 4 whereby a force is transmitted through the spring 40 greater than its designed loading, the spring force applied to the clutch band through the end portion 46 of the spring is overcome to flex the spring 40 in the direction of the end 48. Under such conditions the spring 40 will be compressed, and upon being compressed, the free end 46 in moving toward the end 48 will move the end of the brake band with it, which results in a total reduction of the contact pressure between the brake band and drum to permit slippage between the driving member and the driven member.

When the driving member is rotated in a clockwise direction as viewed in Figure 2 of the drawings, the outer end portion 46 of the spring is moved into engagement with the other end of the wall 32 defining the opening 50 and, accordingly, the outer end portion 48 of spring 40 is effective in applying a force of constant magnitude for expanding the clutch band lining 32 into frictional engagement with the surface 20. In the event that the driven member is overloaded, slippage between the driving member and the driven member will occur, as hereinabove explained.

Figures 4 to 6 of the drawings disclose a modified construction for the friction clutch, the same including a driving member in the form of a pulley 2, a driven member 58 and a clutch mechanism 60 interposed therebetween for transmitting constant torque of a predetermined amount between the driving member and the driven member and to permit slippage between said members when the torque exceeds such amount. As in the previous illustration of the invention, the pulley 2 has a V-shaped peripheral groove 10 adapted to receive a belt driven by some suitable source of power, such as an electric motor, or the like. This pulley 2 is formed with the central hub 12 having a bearing or bushing 14 mounted for rotation about the central hub 62 of the driven member 58. The pulley 2 is further provided with the downwardly depending wall 18 having an inner cylindrical friction surface 20 adapted to be frictionally engaged by the clutch mechanism 60.

The driven member 58 is keyed to a driven shaft 64 for operating any desired instrumentality by key 66 which engages the shaft 64 and the central hub 62. The driving and driven members are retained in operative position with respect to the shaft 64 by means of a spring retaining ring 68 received within an annular groove 70 formed in the shaft 64 adjacent its end which abuts or engages the driven member 58. The driven member 58 is further formed with a disc-like portion 72 extending radially from the central hub 62 which is adapted to support the pulley 2 through the medium of a washer 74 disposed in bearing relation to the lower end of the hub 12 and bushing 14 thereof. The driven member 58 is also provided with an upstanding wall 76 disposed radially and inwardly of the periphery thereof to provide an annular shoulder 78, the wall 76 being concentric with and spaced inwardly of the wall 18 of the driving member 2. Mounted upon the annular shoulder 78 and disposed within the space between the walls 18 and 76 is an expansible clutch band 80 having a lining 82 attached thereto which is adapted to be expanded into frictional engagement with the surface 20 of the driving member whereby torque is transmitted between the driving member and the driven member.

As more particularly shown in Figures 5 and 6 of the drawings, the wall 76 is formed with an opening 84 adjacent which is also a slot 86. One end 88 of the clutch band 80 is turned inwardly and radially and is disposed within the slot 86 for positioning the clutch band 80 and its lining 82 with respect to the driving and driven members. The other end of the clutch band is provided with a slot 90 adapted to receive the outer end 92 of a spiral spring 94 which extends through the opening 84 into engagement with the end of the clutch band 80. The other end 96 of the spiral spring 94 is received within a slot 98 provided in the boss or projection 100 formed integral with and extending upwardly from the body portion 72 of the driven member. The winding of the spiral spring is such that a force is applied to the free end of the clutch band 80 in such an amount as to provide for the transmittal of a constant torque in a predetermined amount between the driving member and the driven member which, if exceeded, causes slippage between the driving member and the driven member. In this modification, constant torque is transmitted between the driving member and the driven member in a predetermined amount, with slippage between said members when the torque exceeds said amount, when the driving member is rotated in a counter-clockwise direction as viewed in Figure 5 of the drawings. As in the embodiment shown in Figures 1–3, the spring 94 transmits all of the torque from the driving to the driven member and the movement and operation of the end 92 and the connected brake band to permit slippage upon overloading is the same as in the first mentioned embodiment of the invention. The clutch mechanism is most effective in controlling transmittal of torque between the driving and driven members when the driving member rotates in a counter-clockwise direction and, while slippage will occur between said members when the driving member rotates in a clockwise direction, the torque far exceeds the torque required to cause slippage when the driving shaft rotates in a counter-clockwise direction.

As will be apparent, the torque at which the clutch mechanisms hereinabove described will slip is dependent upon the initial loading of the springs 40 and 94, assuming of course that the spring tension of the brake band is neutral. This can be accomplished by making the spring with a greater or less spring tension or by adjusting one end thereof such, for example, as disclosed in my copending application, Serial No. 56,846, filed October 27, 1948, now Patent No. 2,582,077, dated January 8, 1952.

As will be clearly apparent, the friction drive between the driving member and driven member in both of the above illustrative embodiments of the invention builds up exponentially in accordance with the formula: Torque $= ke^{f\phi}$ where $k$ is a constant, $e$ is the base of the natural logarithm 2.71828, $f$ is the coefficient of friction and $\phi$ is the angular wrap of the clutch band about the wall 78 expressed as radians which, in this illustrative embodiment of the invention, is slightly less than 360°. Accordingly, a friction drive is effected which will cause slippage between the driving member and driven member at a constant maximum torque. This drive between these members is also always effective below this maximum torque value regardless of any reasonable variation in the coefficient of friction.

While I have herein described and upon the drawings shown illustrative embodiments of the invention, it is to be understood that the invention is not limited thereto, but may comprehend other constructions, arrangements of parts, details and features without departing from the spirit of the invention.

It is claimed:

1. A friction clutch comprising a driving member and a driven member, and means providing for the transmittal of a constant torque in a predetermined amount from said driving to said driven member and permitting slippage between said members when the torque exceeds said amount, said means including an expansible clutch band carried by one of said members and having a clutch band lining frictionally engageable with the other of said members, means for holding one end of said clutch band against relative displacement with respect to said one of said members, and a spiral spring having one end connected to said one of said members and its other end connected to the other end of said clutch band for expanding said clutch band lining into frictional engagement with the other of said members.

2. A friction clutch comprising a driving member and a driven member having concentrically disposed cylindrical walls radially spaced with respect to one another, and means providing for the transmittal of a constant torque in a predetermined amount from said driving to said driven member and permitting slippage between said members when the torque exceeds said amount, said means including an expansible clutch band carried by one of said members within the space between said cylindrical walls and having a clutch band lining frictionally engageable with the other of said members, means for connecting one end of said clutch band to the wall of said one of said members, and a spiral spring having one end connected to said one of said members and having its other end extending outwardly through an opening in the wall of said one of said members and being connected to the other end of said clutch band for expanding said clutch band lining into frictional engagement with the other of said members.

3. A friction clutch comprising a driving member and a driven member having concentrically disposed cylindrical walls radially spaced with respect to one another, one of said walls having an opening and an adjacently disposed slot therethrough, and means providing for the transmittal of a constant torque in a predetermined amount from said driving to said driven member and permitting slippage between said members when the torque exceeds such amount, said means including an expansible clutch band carried by one of said members within the space between said cylindrical walls, said clutch band having an end disposed within said slot for connecting said band to said one of said members and being provided with a clutch band lining frictionally engageable with the wall of the other of said members, and a spiral spring having one end connected to said one of said members and having its other end extending outwardly through said opening and being connected to the other end of said clutch band for expanding said clutch band lining into frictional engagement with the other of said members.

4. A friction clutch comprising a driving member and a driven member having concentrically disposed cylindrical walls radially spaced with respect to one another, one of said walls having an opening, and means providing for the transmittal of a constant torque in a predetermined amount from said driving to said driven member and permitting slippage between said members when the torque exceeds said amount, said means including an expansible clutch band carried by one of said members within the space between said cylindrical walls and having a clutch band lining frictionally engageable with the other of said members, means for connecting one end of said clutch band to said one of said members, said one of said members having a boss disposed in opposed relation to said opening, and a spiral spring having one end connected to said boss and having its other end extending outwardly through said opening and being connected to the other end of said clutch band for expanding said clutch band lining into frictional engagement with the other of said members.

5. A friction clutch comprising a driving member having a cylindrical wall, a driven member having a cylindrical wall spaced radially inwardly of said first-named cylindrical wall, said second named cylindrical wall having an opening and an adjacently disposed slot therethrough, and means providing for the transmittal of a constant torque in a predetermined amount from said driving to said driven member and permitting slippage between said members when the torque exceeds said amount, said means including an expansible clutch band carried by said driven member in embracing relation to the wall thereof, said clutch band having an end disposed within said slot for connecting said band to said driven member and being provided with a clutch band lining frictionally engageable with the wall of said driving member, and a spiral spring having one end connected to said driven member and having its other end extending outwardly through said opening and being connected to the other end of said clutch band for expanding said clutch band lining into frictional engagement with the wall of said driving member.

6. A friction clutch comprising driving and driven members having concentrically disposed torque transmitting elements, and means carried wholly by one of said members providing for the transmittal of torque of a predetermined amount from said driving to said driven member and permitting slippage between said members when the torque exceeds said amount, said means including an expansible clutch band embracing the torque transmitting element of said one of said members and having a clutch band lining frictionally engageable with the torque transmitting element of said other member, means for connecting one end of said clutch band to said one of said members, and a spiral spring for flexibly connecting the other end of said clutch band to said one of said members.

7. A friction clutch comprising a driving member and a driven member having concentrically disposed cylindrical walls radially spaced with respect to one another, and means providing for the transmittal of a constant torque in a predetermined amount from said driving to said driven member and permitting slippage between said members when the torque exceeds said amount, said means including an expansible clutch member carried by one of said members within the space between said cylindrical walls and being frictionally engageable with the other of said members, the inner member having an opening provided in the cylindrical wall thereof, means for operatively connecting one end of said clutch member to said inner cylindrical wall in at least one direction of rotation thereof, the other end of said clutch member extending circumferentially beyond an edge of said opening, and a spring element connected to said last named end of said clutch member and said inner member for expanding said clutch member into frictional engagement with the cylindrical wall of the other of said members.

8. A friction clutch comprising a driving member and a driven member having concentrically disposed cylindrical walls radially spaced with respect to one another, and means providing for the transmittal of a constant torque in a predetermined amount from said driving to said driven member and permitting slippage between said members when the torque exceeds said amount, said means including an expansible clutch member carried by one of said members within the space between said cylindrical walls and being frictionally engageable with the other of said members, the inner member having an opening provided in the cylindrical wall thereof, means for operatively connecting one end of said clutch member to said inner cylindrical wall in at least one direction of rotation thereof, the other end of said clutch member extending circumferentially beyond an edge of said opening, and a spring element disposed inwardly of said inner cylindrical wall and being connected to said inner member, said spring element having an end extending through said opening and being connected to said other end of said clutch member for expanding the same into frictional engagement with the cylindrical wall of the other of said members.

9. In combination, a driven shaft, a driven member provided with a hub fixed thereto and having a cylindrical wall, a drive member having a hub supported by said driven member and mounted for rotation about said first named hub, said driving member having a cylindrical wall concentrically disposed with respect to said first named cylindrical wall and spaced outwardly thereof, and means providing for the transmittal of a constant torque in a predetermined amount from said driving to said driven member and permitting slippage between said members when the torque exceeds said amount, said means including an expansible clutch member carried by one of said members within the space between said cylindrical walls and being frictionally engageable with the other of said members, the inner member having an opening provided in the cylindrical wall thereof, means for operatively connecting one end of said clutch member to said inner cylindrical wall in at least one direction of rotation thereof, the other end of said clutch member extending circumferentially beyond an edge of said opening, and a spring element connected to said last named end of said clutch member and said inner member for expanding said clutch member into frictional engagement with the cylindrical wall of the other of said members.

10. In combination, a driven shaft, a driven member provided with a hub fixed thereto and having a cylindrical wall, a drive member having a hub supported by said driven member and mounted for rotation about said first named hub, said driving member having a cylindrical wall concentrically disposed with respect to said first named cylindrical wall and spaced outwardly thereof, and means providing for the transmittal of a constant torque in a predetermined amount from said driving to said driven member and permitting slippage between said members when the torque exceeds said amount, said means including an expansible clutch member carried by one of said members within the space between said cylindrical walls and being frictionally engageable with the other of said members, the inner member having an opening provided in the cylindrical wall thereof, means for operatively connecting one end of said clutch member to said inner cylindrical wall in at least one direction of rotation thereof, the other end of said clutch member extending circumferentially beyond an edge of said opening, and a spring element disposed inwardly of said inner cylindrical wall and being connected to said inner member, said spring element having an end extending through said opening and being connected to said other end of said clutch member for expanding the same into frictional engagement with the cylindrical wall of the other of said members.

THOMAS R. SMITH.

REFERENCES CITED

The following references are of record in the file of this patent:

UNITED STATES PATENTS

| Number | Name | Date |
|---|---|---|
| 1,561,537 | Haynes | Nov. 17, 1925 |
| 1,856,135 | Nieman | May 3, 1932 |
| 2,050,613 | Kellogg | Aug. 11, 1936 |
| 2,276,430 | Stechbart | Mar. 17, 1942 |